(12) United States Patent
Lehtonen et al.

(10) Patent No.: US 10,116,399 B2
(45) Date of Patent: Oct. 30, 2018

(54) CIRCUIT ARRANGEMENT FOR RF LOOPBACK

(75) Inventors: Pasi Lehtonen, Rusko (FI); Harri Pellikka, Masala (FI); Marko Alanen, Espoo (FI); Pasi Tikka, Munich (DE); Sami Kalajo, Kantvik (FI); Pekka Ikonen, Espoo (FI)

(73) Assignee: SnapTrack, Inc., San Diego, CA (US)

( * ) Notice: Subject to any disclaimer, the term of this patent is extended or adjusted under 35 U.S.C. 154(b) by 169 days.

(21) Appl. No.: 13/993,731

(22) PCT Filed: Dec. 22, 2010

(86) PCT No.: PCT/EP2010/070541
§ 371 (c)(1),
(2), (4) Date: Aug. 23, 2013

(87) PCT Pub. No.: WO2012/084037
PCT Pub. Date: Jun. 28, 2012

(65) Prior Publication Data
US 2013/0329574 A1 Dec. 12, 2013

(51) Int. Cl.
*H04B 1/48* (2006.01)
*H04B 17/14* (2015.01)
*H04B 17/21* (2015.01)

(52) U.S. Cl.
CPC ............ *H04B 17/14* (2015.01); *H04B 1/48* (2013.01); *H04B 17/21* (2015.01)

(58) Field of Classification Search
CPC ......... H04B 17/00; H04B 17/14; H04B 17/21
See application file for complete search history.

(56) References Cited

U.S. PATENT DOCUMENTS

| 5,337,316 A | * | 8/1994 | Weiss | H04B 17/00 714/716 |
| 5,528,585 A | * | 6/1996 | Cooley | H04B 7/2656 370/347 |

(Continued)

FOREIGN PATENT DOCUMENTS

| EP | 0 920 146 A2 | 6/1999 |
| JP | 05-145499 A | 6/1993 |

(Continued)

OTHER PUBLICATIONS

International Search Report and Written Opinion—PCT/EP2010/070541-ISA/EPO—dated Jul. 4, 2011.

*Primary Examiner* — Sulaiman Nooristany
(74) *Attorney, Agent, or Firm* — Patterson & Sheridan, L.L.P.

(57) ABSTRACT

A circuit arrangement includes a transceiver unit, a switching device coupled to the transceiver unit with a terminal and a control device coupled to the switching device. The control device is configured to operate in a first and in a second mode of operation. In the first mode of operation, the switching device is configured by the control device such that a first signal is routed from the transceiver unit via the switching device back to the transceiver unit in a feedback loop. In the second mode of operation, the switching device is configured by the control device such that a second signal is routed from the transceiver unit via the switching device to the terminal or the second signal is routed from the terminal via the switching device to the transceiver unit.

7 Claims, 4 Drawing Sheets

(56) References Cited

U.S. PATENT DOCUMENTS

| | | | |
|---|---|---|---|
| 6,006,112 A * | 12/1999 | Rucki | H04B 17/20 455/101 |
| 2004/0037353 A1* | 2/2004 | Henriksson | H04B 1/40 375/224 |
| 2006/0194553 A1* | 8/2006 | Ozaki | G01R 29/10 455/226.1 |
| 2008/0280571 A1* | 11/2008 | Rofougaran | H01Q 3/26 455/77 |
| 2009/0233562 A1* | 9/2009 | Kim | H04B 17/14 455/115.1 |
| 2010/0277252 A1* | 11/2010 | Gorbachov | H01P 1/213 333/104 |

FOREIGN PATENT DOCUMENTS

| | | | | |
|---|---|---|---|---|
| WO | WO 97/00586 A1 | 1/1997 | | |
| WO | WO 9700586 A1 * | 1/1997 | | H04W 24/00 |
| WO | WO-9700586 A1 * | 1/1997 | | H04W 24/00 |
| WO | WO 2007/135235 A1 | 11/2007 | | |

* cited by examiner

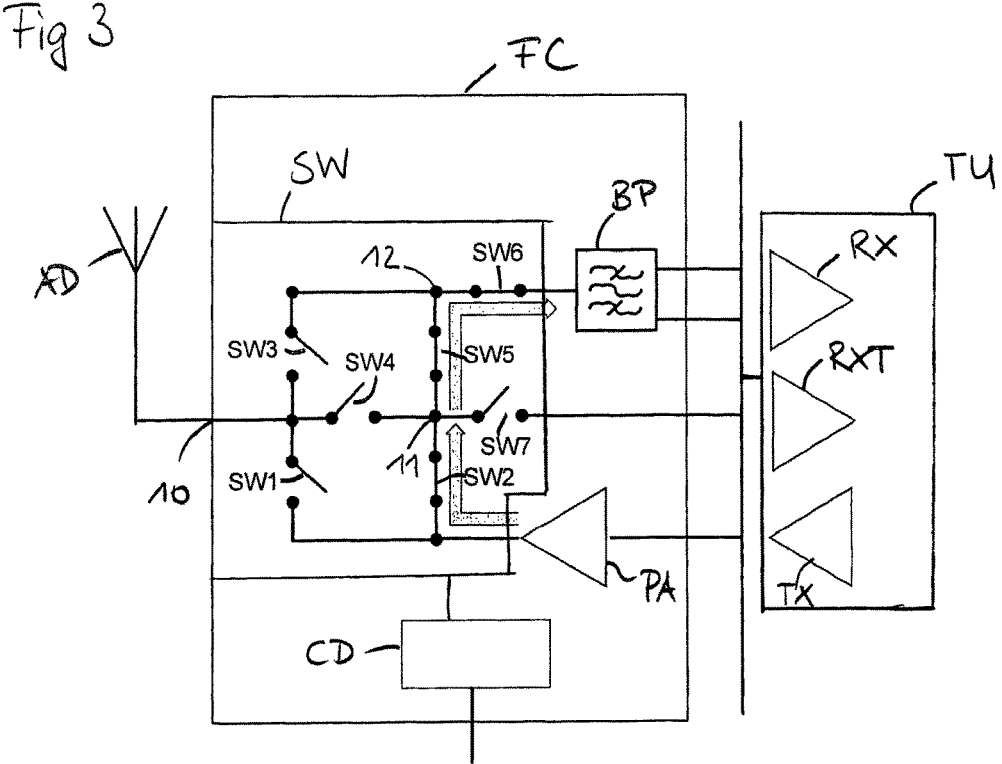
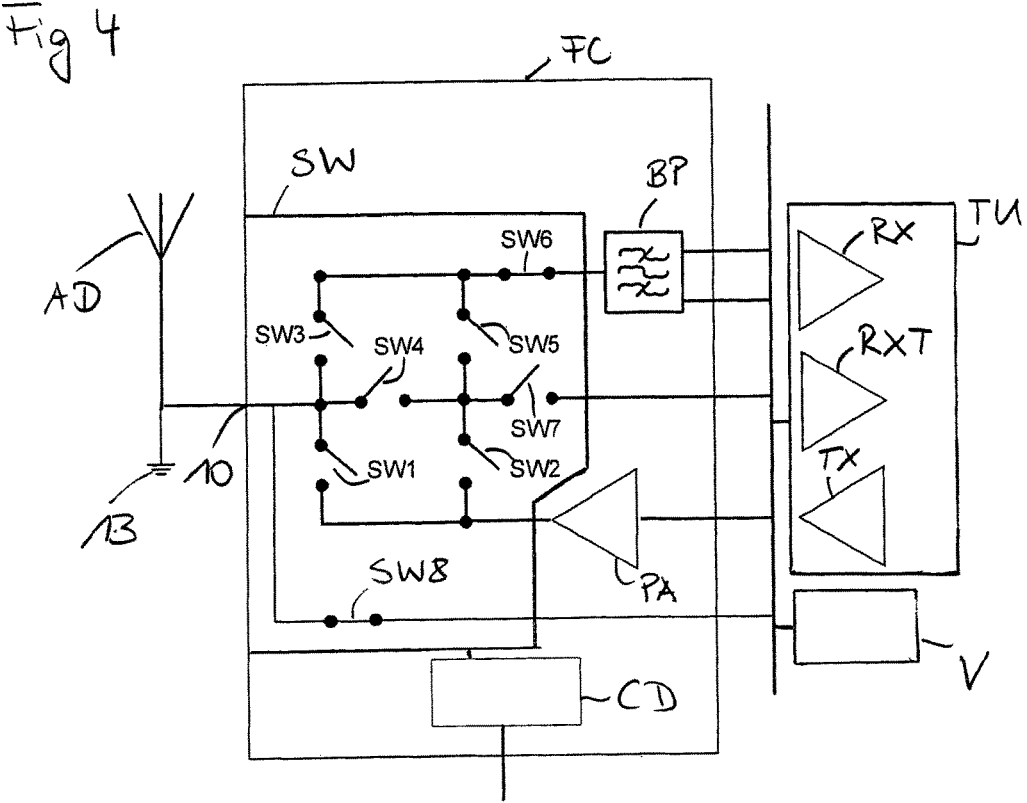

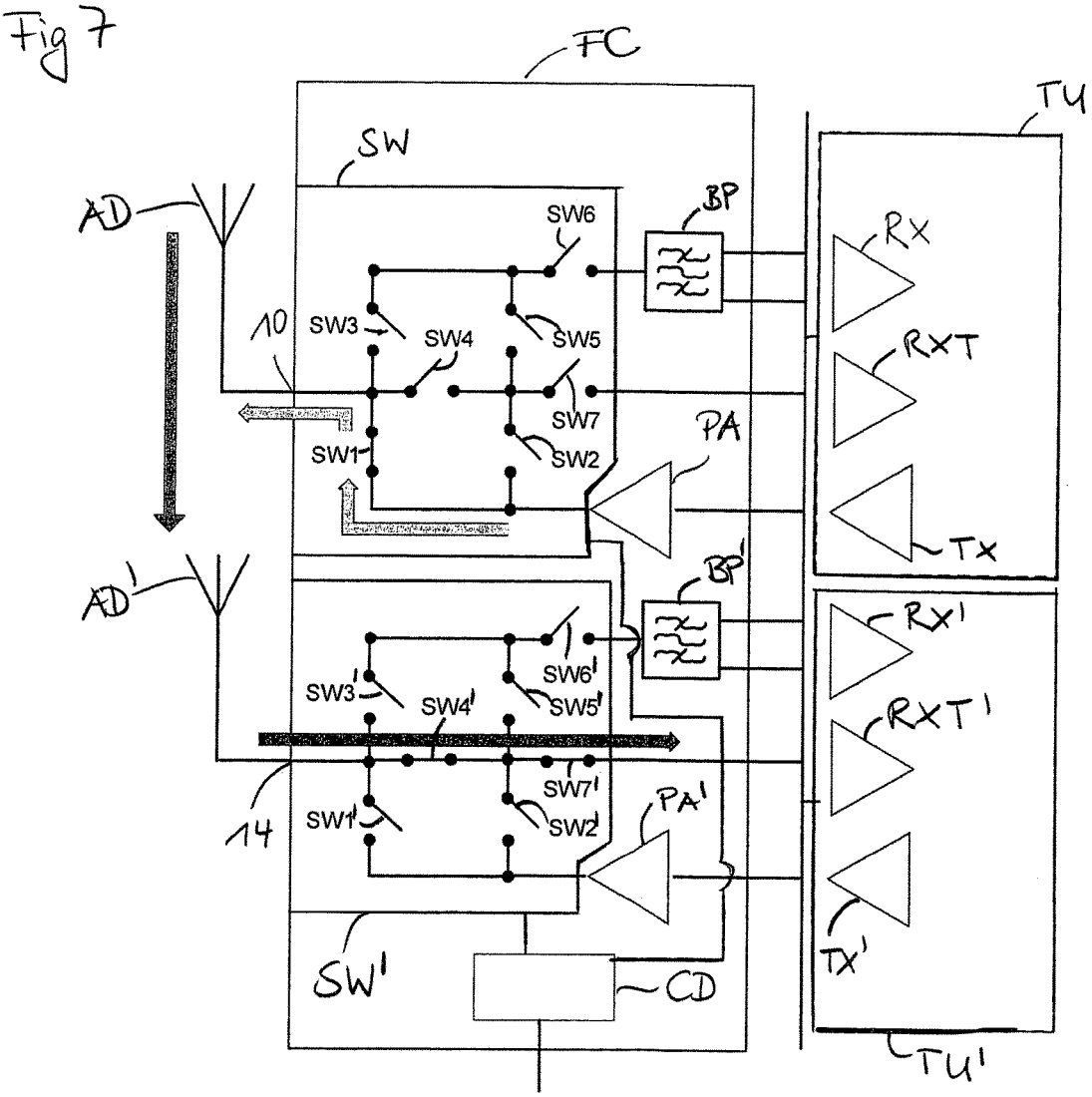

CIRCUIT ARRANGEMENT FOR RF LOOPBACK

This patent application is a national phase filing under section 371 of PCT/EP2010/070541, which was filed Dec. 22, 2010 and is incorporated herein by reference in its entirety.

TECHNICAL FIELD

The present invention relates to a circuit arrangement.

BACKGROUND

The complexity of communication devices, e.g., mobile phone, USB modem, data card, etc., is growing. These devices need to support multiple communication systems with multiple radio frequency bands to enable a more flexible use of the device in any geographical location. The same device should be able to support global system for mobile communication, GSM, wideband code division multiple access, WCDMA, long-term evolution, LTE, and even code division multiple access, CDMA systems in different frequency bands. Devices like so-called smartphones offer multiple air interfaces of the list above. The market for such devices is growing with rapidly increasing volumes.

The air interface by which a mobile communication device interacts is strictly specified in corresponding standards. To enable a radio frequency, RF, transceiver available today to fulfill all specified parameters, this RF transceiver needs to be tuned and tested before use. Tuning of an RF transceiver comprises tuning of parameters like, for example, transmitter power level and receiver received signal strength indication, RSSI, as well as signaling tuning. After the tuning, the parameters are tested against predefined limits. This tuning and testing is time-consuming. It is one of the most time-consuming steps in production of a mobile communication device. Usually, every frequency band and communication system needs to be tuned and tested separately for a device. The more frequency bands and communication systems a device needs to support, the more time is consumed in this production phase. The more time a device needs in production time, the fewer devices can be manufactured within one day, for example. To achieve more capacity, more production lines need to be built for testing and tuning. As in conventional testing and tuning specific external test equipment is needed, this implies huge investments. The aim in mobile communication device production is to reach a capacity of 100%. Less than 100% capacity reduces the profitability of the investment. With conventional testing and tuning equipment, it is very difficult to keep the capacity at 100%.

SUMMARY OF THE INVENTION

Embodiments of the present invention provide a circuit arrangement which enables reduction in test effort, e.g., in time or in equipment investment.

In one embodiment, a circuit arrangement comprises a transceiver unit, a switching device coupled to the transceiver unit, and a control device coupled to the switching device. The switching device has a terminal which is configured to be coupled to an antenna device. The control device is configured to operate the circuit arrangement in a first and in a second mode of operation. In the first mode of operation, the switching device is configured by the control device such that a first signal is routed from the transceiver unit via the switching device back to the transceiver unit in a feedback loop. In the second mode of operation, the switching device is configured by the control device such that a second signal is routed from the transceiver unit via the switching device to the terminal or the second signal is routed from the terminal via the switching device to the transceiver unit.

In the first mode of operation, the first signal is routed from the transceiver unit via the switching device back to the transceiver unit. This internal feedback loop includes all components the signal passes on its way between transceiver unit and the terminal which can be connected to the antenna device. The difference between the first signal sent from the transceiver unit and the first signal received at the end of the feedback loop by the transceiver unit is calculated and evaluated in the transceiver unit. Parameters of the components included in the feedback loop are tuned accordingly to achieve desired test results.

In the second mode of operation, the second signal is routed from the transceiver unit via the switching device to the terminal. This corresponds to normal sending or transmitting of the second signal. Or in the second mode of operation, the second signal is received by the antenna device and is routed from the terminal via the switching device to the transceiver unit. This corresponds to normal receiving of the second signal.

By use of the switching device in connection with the transceiver unit, the circuit arrangement enables a self-testing of components in the feedback loop. External test equipment is made redundant which, by advantage, significantly reduces cost and investment. As for this self-testing just a power supply is necessary for each device under test, a considerable amount of time is saved in testing.

The first mode of operation corresponds to a self-testing mode. The second mode of operation corresponds to normal sending and receiving of radio frequency signals. The first and the second signal comprise each a radio frequency signal proceeding within the circuit arrangement. The circuit arrangement is designed for use in communication devices, especially mobile or cordless devices, in communication systems as named in the opening part using respective frequencies.

In another embodiment example, in the first mode of operation, the switching device is configured by the control device additionally such that the first signal is routed from the transceiver unit via the switching device to the terminal and via the switching device back to the transceiver unit in the feedback loop.

This advantageously enables the self-tuning and testing of the whole signal path between the transceiver unit and the connectable antenna device. Thereby, a much higher accuracy of the testing is achieved in comparison to separate testing of the involved components. Especially, the tuning is simplified and optimized as all changing parameters are taken into account in the feedback loop. The components comprise, e.g., printed circuit boards, PCB, with varying layer thickness and metallization, discrete components, or filters with changing tolerances.

In yet another exemplary embodiment, the circuit arrangement further comprises a power amplifier device connected between the transceiver unit and the switching device in a transmitting path and a filtering device connected between the transceiver unit and the switching device in a receiving path.

The power amplifier device may include a variable gain amplifier which amplifies a signal to be transmitted. The filter may include a bandpass which operates on a received signal.

In a further embodiment example, the switching device comprises a number of switches and the control device comprises a table with different switching states for controlling respective positions of each of the switches in the first and in the second mode of operation.

By use of the table, the control device drives the switches so as to build the feedback loop in the first mode of operation or the transmitting and the receiving path in the second mode of operation.

Advantageously, the second mode of operation cannot only be used during the production phase of a mobile communication device but also during normal use of the communication device, e.g., for retuning some of the parameters because of changing environmental conditions.

In another exemplary embodiment, the switching device, the control device, the power amplifier device, and the filtering device are implemented in a front-end circuit.

The front-end circuit can be implemented, for instance, in an application-specific integrated circuit, ASIC.

As the front-end circuit is the last part in a transceiver chain before the antenna, this re-use of the front-end for a self-testing and tuning is of advantage as all the components in the chain are taken into account.

In another embodiment example, the transceiver unit is configured to transmit and/or to receive a radio frequency signal in at least two radio frequency bands.

The transceiver unit is, for example, configured for GSM, CDMA, WCDMA, UMTS, and/or global positioning system, GPS.

In a further exemplary embodiment, the transceiver unit comprises a transmitter device, a receiver device, and a testing and tuning receiver device.

The transmitter device and the receiver device are used in the first and/or the second mode of operation.

In another embodiment example, the testing and tuning receiver is configured to receive the radio frequency signal and to measure the strength of the radio frequency signal. Thereby, the testing and tuning receiver device is an endpoint of the feedback loop in the first mode of operation.

In the first mode of operation, the testing and tuning receiver device receives the first signal sent by the transmitter device via the feedback loop.

In one example application, the transmitted power of a mobile communication device, also known as total radiated power, TRP, is tested and tuned. The transmitted power is a combination of the transmitter device power and the power amplifier device power. Both of these parameters have to be combined to calculate the total power at the terminal with the connectable antenna device. Even if the power of each component can be calculated separately, it is necessary to involve the whole chain of components the signal passes from the transmitter device to the terminal to achieve the necessary accuracy in tuning the total power transmitted. This is advantageously realized by the invention described.

BRIEF DESCRIPTION OF THE DRAWINGS

The text below explains the invention in detail using embodiment examples with reference to the drawings. Components and circuit elements that are functionally identical or have the identical effect bear identical reference numbers. Insofar as circuit parts or components correspond to one another in function, a description of them will not be repeated in each of the following figures. Therein:

FIG. 3 shows a third example of the circuit arrangement according to the invented principle in the first mode of operation;

FIG. 4 shows a fourth example of the circuit arrangement according to the invented principle in the first mode of operation;

FIG. 7 shows an application example of a circuit arrangement according to the invented principle.

DETAILED DESCRIPTION OF ILLUSTRATIVE EMBODIMENTS

Figure 1:
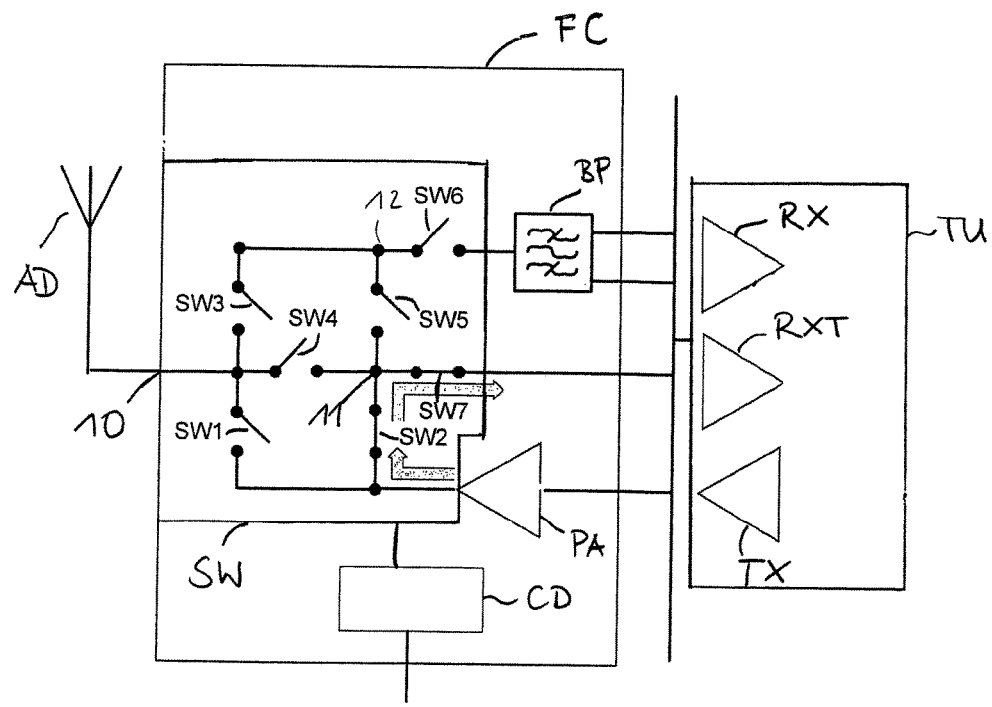
FIG. 1 shows a first example of the circuit arrangement according to the invented principle in the first mode of operation.

FIG. 1 shows a first example of a circuit arrangement according to the invented principle in the first mode of operation. The circuit arrangement comprises a transceiver unit TU, a switching device SW with a terminal 10, and a control device CD. The switching device SW is coupled to the transceiver unit TU. The control device CD is coupled to the switching device SW. An antenna device AD can be connected to the terminal 10. In this example, the antenna device AD is connected to the terminal 10.

The transceiver unit TU comprises a receiver device RX, a transmitter device TX, and a testing and tuning receiver RXT.

The circuit arrangement further comprises a filtering device BP which is connected between the transceiver unit TU and the switching device SW in a receiving path of the circuit arrangement. Furthermore, a power amplifier device PA is provided which is connected between the transceiver unit TU and the switching device SW in a transmitting path of the circuit arrangement.

The switching device SW comprises seven switches SW1, SW2, SW3, SW4, SW5, SW6, and SW7. Each of the switches SW1 to SW7 is implemented as, for example, electronic semiconductor switch. The first switch SW1 is connected between an output of the power amplifier device PA and the terminal 10. The second switch SW2 is connected between the output of the power amplifier device PA and a connection point 11. The connection point 11 is connected to the transceiver device TU via the seventh switch SW7. The sixth switch SW6 is connected between an output of the filtering device BP and a further connection point 12. The further connection point 12 is coupled to the connection point 11 via the fifth switch SW5. The third switch SW3 is connected between the terminal 10 and the further connection point 12. The fourth switch SW4 is connected between the terminal 10 and the connection point 11. The switches SW1 to SW7 are driven by the control device CD by means of a switching table comprised by the control device CD.

The transceiver unit TU is configured to transmit and/or to receive radio frequency signals in at least two radio frequency bands using its receiver device RX and its transmitter device TX. The testing and tuning receiver device RXT is used in addition to the receiver device RX for testing and tuning purposes in the circuit arrangement.

The control device CD is configured to operate the circuit arrangement in a first and in a second mode of operation. In the first mode of operation, the switching device SW is configured by the control device CD such that a first signal is routed from the transceiver unit TU via the switching device SW back to the transceiver unit TU in a feedback loop. In the second mode of operation, the switching device SW is configured by the control device CD such that a second signal is routed from the transceiver unit TU via the switching device SW to the terminal 10 or the second signal is routed from the terminal 10 via the switching device SW to the transceiver unit TU.

In the first example depicted in FIG. 1, the circuit arrangement is driven in the first mode of operation. The second and the seventh switches SW2, SW7 are closed. The remaining switches SW1, SW3, SW4, SW5, and SW6 are open. Consequently, the first signal in this case is emitted from the transmitter device TX to the power amplifier device PA and is routed in a feedback loop via switches SW2 and SW7 back to the testing and tuning receiver device RX of the transceiver unit TU. The path of the first signal is marked with respective arrows. Thereby, the testing and tuning receiver device RXT is tuning and testing the transmitter device TX. The testing and tuning receiver RXT, for instance, measures the total radiated power of the first signal, compares the measurement results to a predefined value and adjusts a suitable parameter of the transmitter device TX accordingly, if necessary.

The control device CD, the switching device SW, the power amplifier device PA, and the filtering device BP can be implemented in an integrated circuit, for instance, in an application-specific integrated circuit, ASIC. Such a circuit is commonly known as front-end circuit, as depicted as front-end circuit FC in FIG. 1.

The transceiver unit TU is connected to the components of the front-end circuit FC via a bus interface. The front-end circuit FC may further comprise an oscillator, a directional coupler, or more filtering devices in different implementations.

The control device CD can be implemented as GPIO, general purpose input output interface. It can be accessed via a serial bus interface, for instance, SPI.

The first mode of operation can also be called a self-testing mode. It can be seen that the whole transceiver chain is passed by the first signal in this self-testing mode. Therefore, all components on its way are tested and tuned simultaneously. In conventional testing, external test equipment would be connected to the terminal 10 instead of an antenna device. With the invented principle, the test effort is reduced, as no external test equipment is needed. This also leads to an accelerated testing.

Figure 2:
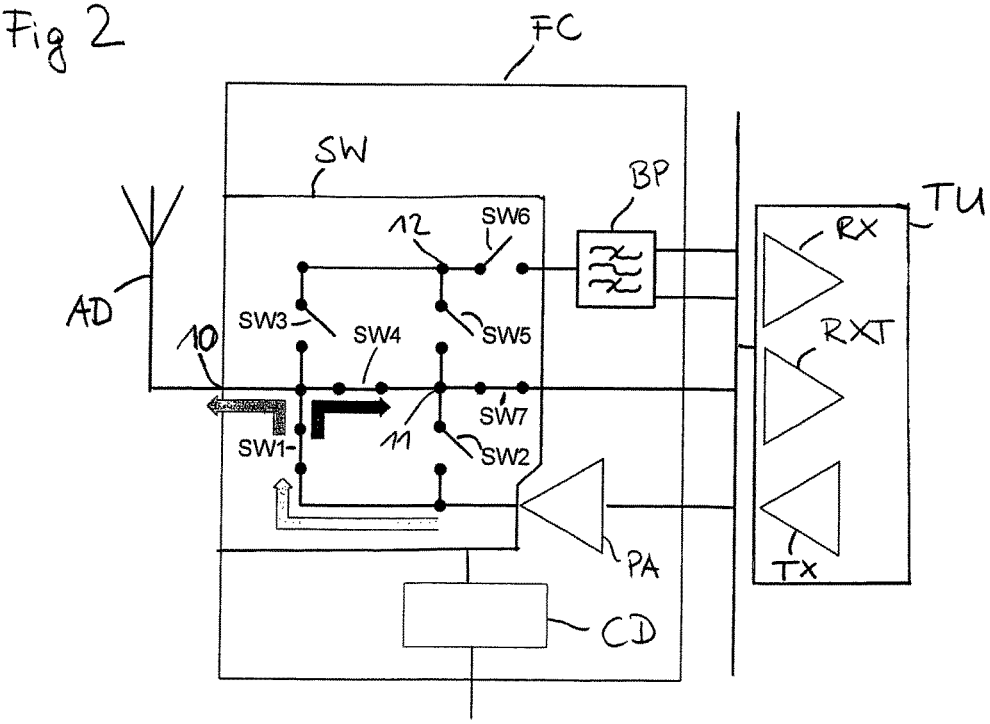
FIG. 2 shows a second example of the circuit arrangement according to the invented principle in the first mode of operation.

FIG. 2 shows a second example of the circuit arrangement according to the invented principle in the first mode of operation. Except for the position of the switches of the switching device SW, this example matches the example described in FIG. 1. In this second example, switches SW1, SW4, and SW7 are closed. The remaining switches SW2, SW3, SW5, and SW6 are open. The path of the first signal once again is marked with arrows. So the first signal is sent out by the transmitter device TX, it passes the power amplifier device PA and travels via the first switch SW1 to the terminal 10 and the connected antenna device. In addition, the first signal travels back via the closed switches SW4 and SW7 to the testing and tuning receiver device RXT. The testing and tuning receiver RXT measures the received power and calculates the ratio of the transmitted power, i.e., as depicted by the left arrow, and the received power, as depicted by the right arrow. By this, the existence of the antenna device AD is tested. This test is especially useful in addition to the testing during the production phase during the normal use of a communication device with a circuit arrangement according to the invented principle.

FIG. 3 shows a third example of the circuit arrangement according to the invented principle in the first mode of operation. The circuit arrangement in this example matches the first and the second example as shown in FIGS. 1 and 2, except for the position of the switches of the switching device SW. In the third example, switches SW2, SW5 and SW6 are closed whereas the remaining switches SW1, SW3, SW4 and SW7 are open. Consequently, the first signal is sent by the transmitter device TX and propagates via the power amplifier device PA, the second switch SW2, the fifth switch SW5, the sixth switch SW6 and the filtering device BP to the receiver device RX. In this example, the receiver device RX is tested and tuned.

FIG. 4 shows a fourth example of the circuit arrangement according to the invented principle in the first mode of operation. In addition to the preceding examples, the switching device SW has an eighth switch SW8. A detector V is connected to the switching device SW. The detector V might also be implemented within the transceiver unit TU. The eighth switch SW8 is connected between the terminal 10 and an output of the detector V. The terminal 10 is additionally connected to a reference potential terminal 13. In this example, the switch SW8 is closed. With this, the existence of the antenna device AD can be tested with a DC voltage routed via the front-end circuit FC. In particular, antenna devices AD with DC ground can be detected. This includes planar inverted F-antennas, for example, which are commonly used in mobile communication devices.

Figure 5:
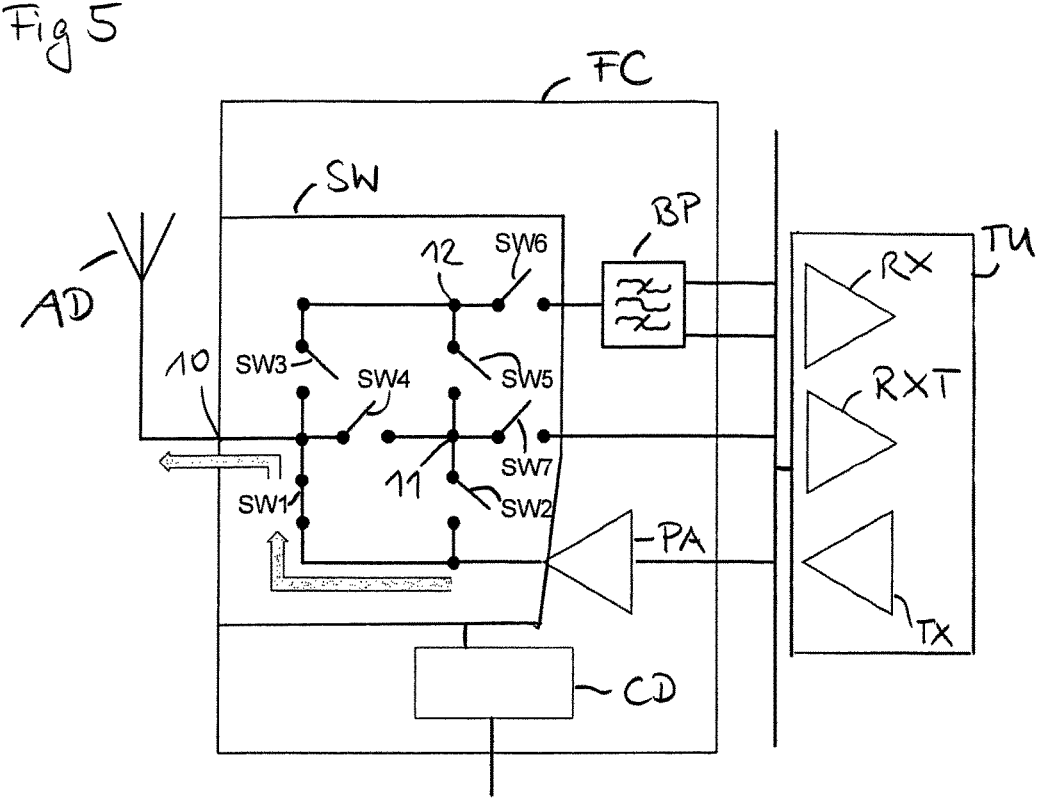
FIG. 5 shows a first example of the circuit arrangement according to the invented principle in the second mode of operation.

FIG. 5 shows a first example of the circuit arrangement according to the invented principle in the second mode of operation. The circuit arrangement matches those examples of FIGS. 1 to 3, except for the position of the switches of the switching device SW. In FIG. 5, the first switch SW1 is closed, whereas the remaining switches SW2 to SW7 are open. A second signal is sent out by the transmitter device TX and propagates through the front-end circuit FC via the power amplifier device PA and the first switch SW1 to the terminal 10. It is then radiated by the antenna device AD. This represents the normal transmitting state which is active during communication. The path of the second signal is marked with arrows.

Figure 6:
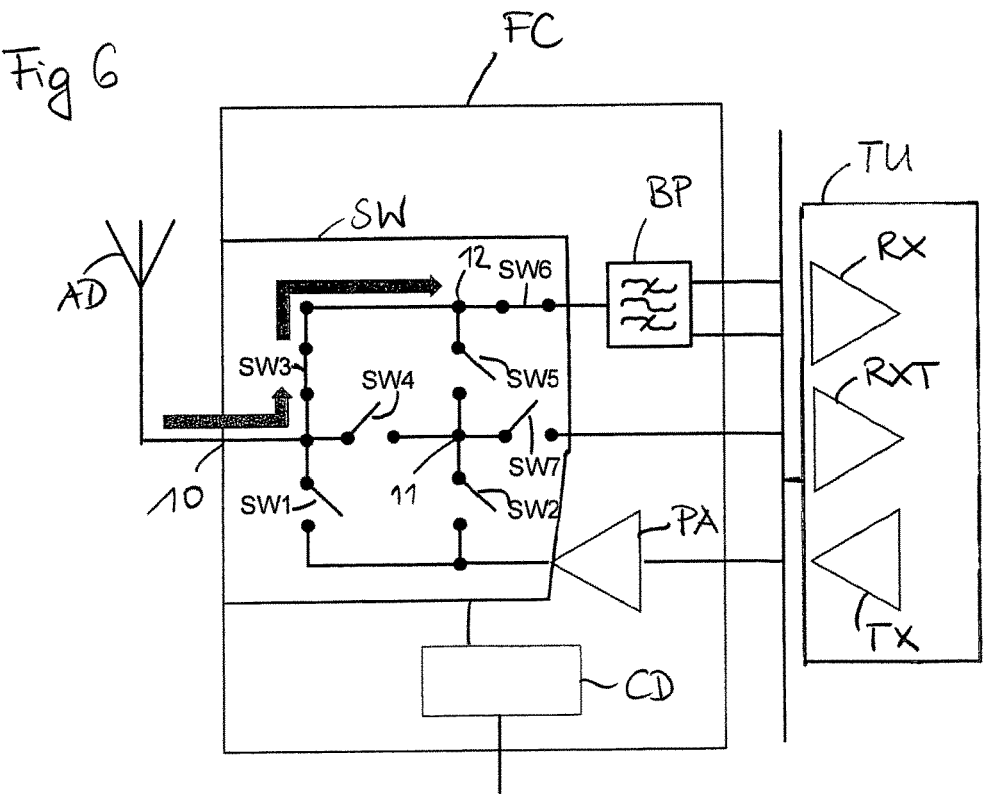
FIG. 6 shows a second example of the circuit arrangement according to the invented principle in the second mode of operation.

FIG. 6 shows a second example of the circuit arrangement according to the invented principle in the second mode of operation. The front-end circuit FC once again matches the front-end circuit FC of FIG. 5, except for the position of the switches of the switching device SW. In this example, switches SW3 and SW6 are closed, whereas switches SW1, SW2, SW4, SW5 and SW7 are open. In this example, the second signal is received by the antenna device AD at terminal 10 and propagates via switches SW3 and SW6, filtered in the filtering device BP, to the receiver device RX. This represents the normal receiver state which is active when the device with the circuit arrangement is in communication.

It can be seen that with the invented principle, the front-end circuit FC, which is normally used for sending and receiving radio frequency signals during communication in the second mode of operation, is advantageously reused for testing and tuning purposes in the first mode of operation.

FIG. 7 shows an application example of a circuit arrangement according to the invented principle. This application example resembles the one described in FIG. 5. In addition to FIG. 5, the front-end circuit FC here comprises a second switching device SW' which is connected to the control device CD. A second transmitter unit TU' with a second receiver device RX', a second testing and tuning receiver device RXT' and a second transmitter device TX' is provided, as well. Furthermore, a second filtering device BP' is connected between the second transmitter unit TU' and the second switching device SW'. A second power amplifier device PA' is connected between the second transceiver unit TU' and the second switching device SW'. The second switching device SW' comprises seven switches SW1', SW2', SW3', SW4', SW5', SW6' and SW7' as well as a second terminal 14. A second antenna device AD' is connected to the second terminal 14. The antenna AD shown in the upper part of FIG. 7 is used for a low frequency band. The second antenna AD' shown in the lower part of FIG. 7 is used for a high frequency band. Correspondingly, the transceiver unit TU in the upper part is used for the low band and the second transceiver unit TU' shown in the lower part of FIG. 7 is used for the high band.

The control device CD, especially its switching table, is adapted so as to be enabled to drive both switching devices SW and SW'. The low band antenna device AD is used, for instance, for frequencies up to 1 GHz. The high band second antenna device AD' is used, for instance, for frequencies up to 2 GHz. In order to detect antenna device existence, antenna coupling to another antenna needs to be known. Therefore, switch SW1 of the switching device SW is closed whereas the remaining switches of switching device SW are open. Switches SW4' and SW7' are closed in the second switching device SW' whereas the remaining switches of the second switching device SW' are open. So a signal sent out by the transmitter device TX propagates via the power amplifier device PA and switch SW1 to the terminal 10 and the connected antenna device AD. The radiated signal is received by the second antenna device AD' at second terminal 14 and travels via switches SW4' and SW7' to the second sending and tuning receiver RXT'. The second tuning and testing receiver RXT' either measures a fundamental frequency or a harmonic frequency of the signal received.

The invention is not restricted to the exemplary embodiments by the description on the basis of said exemplary embodiments. Rather, the invention encompasses any new feature and also any combination of features, which in particular comprises any combination of features in the patent claims and any combination of features in the exemplary embodiments, even if this feature or this combination itself is not explicitly specified in the patent claims or exemplary embodiments.

The invention claimed is:

1. A frontend circuit of a mobile communication device comprising:
    a transceiver unit comprising a transmitter device, a receiver device and a testing and tuning receiver device, wherein the testing and tuning receiver device is separate from the transmitter device and the receiver device;
    a switching device coupled to the transceiver unit, the switching device including a terminal configured to be coupled to an antenna device; and
    a control device coupled to the switching device, the control device being configured to operate the frontend circuit in a first mode of operation and in a second mode of operation,
    wherein, in the first mode of operation, the switching device is configured by the control device such that a first signal path is routed from the transmitter device of the transceiver unit, through a first switch of the switching device, to a node and from the node back to the testing and tuning receiver device of the transceiver unit in a feedback loop through a second switch of the switching device, wherein the switching device is configured to selectively couple the node to the terminal through a third switch of the switching device, wherein the first switch, the second switch, and the third switch are different switches,
    wherein, in the second mode of operation, the switching device is configured by the control device such that a second signal path is routed from the transmitter device of the transceiver unit via the switching device to the terminal or the second signal path is routed from the terminal via the switching device to the transceiver unit, and
    wherein the testing and tuning receiver device is configured to receive a radio frequency signal via the first signal path and to measure a strength of the radio frequency signal.

2. The frontend circuit according to claim 1, further comprising:
    a power-amplifier device coupled between the transceiver unit and the switching device in a transmitting path; and
    a filtering device coupled between the transceiver unit and the switching device in a receiving path.

3. The frontend circuit according to claim 1, wherein the switching device comprises a plurality of switches and the control device comprises a table with different switching states for controlling respective positions of each of the switches in the first mode of operation and in the second mode of operation.

4. The frontend circuit according to claim 2, wherein the switching device, the control device, the power-amplifier device and the filtering device are implemented in the frontend circuit.

5. The frontend circuit according to claim 1, wherein the switching device and the control device are implemented in the frontend circuit.

6. The frontend circuit according to claim 1, wherein the transceiver unit is configured to transmit and/or to receive a radio frequency signal in at least two radio frequency bands.

7. A frontend circuit of a mobile communication device comprising:
    a transceiver unit comprising a transmitter device, a receiver device and a testing and tuning receiver device, wherein the testing and tuning receiver device is separate from the transmitter device and the receiver device;
    a switching device coupled to the transceiver unit, the switching device including a terminal configured to be coupled to an antenna device; and
    a control device coupled to the switching device, the control device being configured to operate the frontend circuit in a first mode of operation and in a second mode of operation,
    wherein, in the first mode of operation, the switching device is configured by the control device such that a first signal path is routed from the transmitter device of the transceiver unit, through a first switch of the switching device, to a node and from the node back to the testing and tuning receiver device of the transceiver unit in a feedback loop through a second switch of the switching device, wherein the switching device is configured to selectively couple the node to the terminal through a third switch of the switching device, wherein the first switch, the second switch, and the third switch are different switches, wherein, in the second mode of operation, the switching device is configured by the control device such that a second signal path is routed from the transmitter device of the transceiver unit via the switching device to the terminal or the second signal path is routed from the terminal via the switching device to the transceiver unit, wherein the testing and tuning receiver device is configured to receive a radio frequency signal and to measure a strength of the radio frequency signal, wherein the testing and tuning receiver device is an endpoint of the feedback loop in the first mode of operation.

\* \* \* \* \*